US012422035B2

(12) United States Patent
Schütterle et al.

(10) Patent No.: US 12,422,035 B2
(45) Date of Patent: Sep. 23, 2025

(54) TRANSMISSION AND METHOD FOR PRODUCING DIFFERENT TRANSMISSIONS, IN PARTICULAR A RANGE OF TRANSMISSIONS

(71) Applicant: SEW-EURODRIVE GMBH & CO. KG, Bruchsal (DE)

(72) Inventors: Ingo Schütterle, Bruchsal (DE); Tobias Schwan, Wiesloch (DE); Daniel Frank, Kraichtal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 95 days.

(21) Appl. No.: 18/241,359

(22) Filed: Sep. 1, 2023

(65) Prior Publication Data

US 2023/0407957 A1    Dec. 21, 2023

Related U.S. Application Data

(63) Continuation of application No. 17/598,562, filed as application No. PCT/EP2020/025098 on Feb. 27, 2020, now Pat. No. 11,746,879.

(30) Foreign Application Priority Data

Mar. 26, 2019   (DE) .......................... 102019002191.6

(51) Int. Cl.
*F16H 57/02*        (2012.01)
*F16H 57/021*       (2012.01)
(Continued)

(52) U.S. Cl.
CPC ......... *F16H 57/021* (2013.01); *F16H 57/029* (2013.01); *F16H 57/031* (2013.01);
(Continued)

(58) Field of Classification Search
CPC .... F16H 57/021; F16H 57/029; F16H 57/031; F16H 57/033; F16H 57/0424; F16H 57/0471; F16H 57/0472
See application file for complete search history.

(56) References Cited

U.S. PATENT DOCUMENTS

| 3,681,919 A | 8/1972 | Forster |
| 3,864,990 A | 2/1975 | Lacoste |

(Continued)

FOREIGN PATENT DOCUMENTS

| CN | 103518078 A | 1/2014 |
| CN | 103518079 A | 1/2014 |

(Continued)

OTHER PUBLICATIONS

International Search Report issued in corresponding International Application No. PCT/EP2020/025098, dated Apr. 29, 2020, pp. 1-3, English Translation.

*Primary Examiner* — Adam D Rogers
(74) *Attorney, Agent, or Firm* — Carter, DeLuca & Farrell LLP

(57) ABSTRACT

A transmission includes a first housing part, a second housing part connected to the first housing part, and bearings accommodated in the first housing part and supporting an input shaft in a rotatable manner. The input shaft projects through a recess that extends through the second housing part, and a cover part is connected to the first housing part. The cover part or a flange part inserted into the cover part accommodates a sealing system, which provides sealing with respect to the input shaft. The second housing part has an inlet for lubricating oil, which terminates in an axial bore being open with respect to the side of the first housing part facing the cover part, and in a second annular space. The opening of the axial bore facing the cover part is covered and/or sealed by the cover part, and rolling elements of two (Continued)

bearings at least also restricting and/or surrounding the second annular space together with the first housing part.

21 Claims, 13 Drawing Sheets

(51) Int. Cl.
  *F16H 57/029* (2012.01)
  *F16H 57/031* (2012.01)
  *F16H 57/033* (2012.01)
  *F16H 57/04* (2010.01)
(52) U.S. Cl.
  CPC ....... *F16H 57/033* (2013.01); *F16H 57/0424* (2013.01); *F16H 57/0471* (2013.01); *F16H 57/0472* (2013.01)

(56) References Cited

U.S. PATENT DOCUMENTS

| | | | |
|---|---|---|---|
| 8,740,226 B2 | 6/2014 | Schutterle | |
| 9,140,364 B2 | 9/2015 | Schutterle | |
| 10,634,232 B2 | 4/2020 | Reineberg | |
| 11,035,456 B1 | 6/2021 | Allen | |
| 11,746,879 B2 * | 9/2023 | Schütterle | F16H 57/0471 74/606 R |
| 12,146,565 B2 * | 11/2024 | Wu | F16H 57/021 |
| 12,196,307 B2 * | 1/2025 | Wu | F16H 57/0452 |
| 2015/0159697 A1 | 6/2015 | Fischer et al. | |
| 2022/0333676 A1 | 10/2022 | Li | |
| 2024/0384785 A1 * | 11/2024 | Wu | F16H 57/031 |

FOREIGN PATENT DOCUMENTS

| | | | | |
|---|---|---|---|---|
| CN | 103671852 A | | 3/2014 | |
| CN | 212564320 U | * | 2/2021 | |
| CN | 113958691 A | | 1/2022 | |
| CN | 115280039 A | | 11/2022 | |
| DE | 102009014314 A1 | | 9/2010 | |
| DE | 102010053808 A1 | | 6/2012 | |
| DE | 102009014315 B4 | * | 1/2018 | ............ F16C 33/664 |
| DE | 102017206598 A1 | | 10/2018 | |
| DE | 102021002928 A1 | | 1/2022 | |
| DE | 102023000505 A1 | * | 9/2023 | |
| DE | 102023001917 A1 | * | 12/2023 | |
| DE | 102023002185 A1 | * | 12/2023 | ......... F16H 57/0428 |
| EP | 2674645 A1 | | 12/2013 | |
| WO | 2012123045 A1 | | 9/2012 | |

* cited by examiner

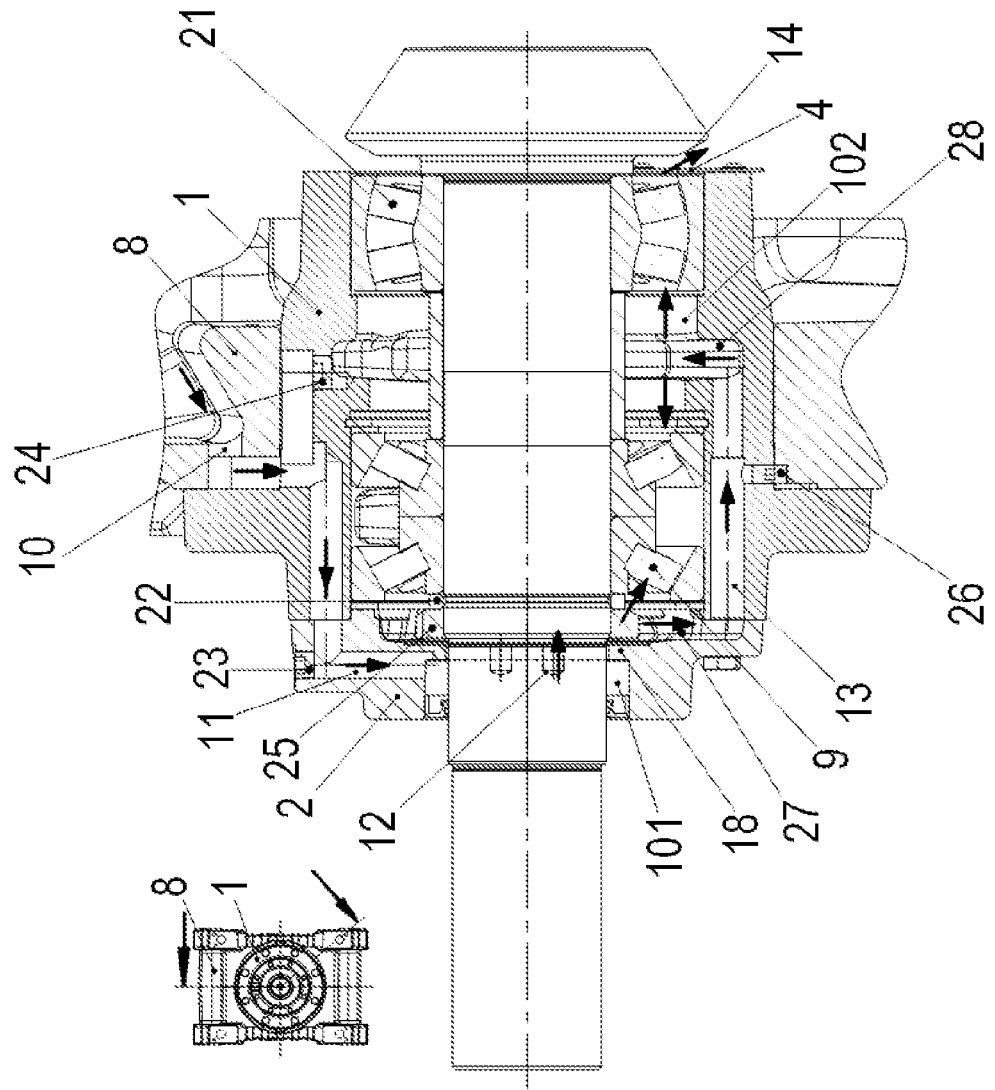
Fig. 1.1

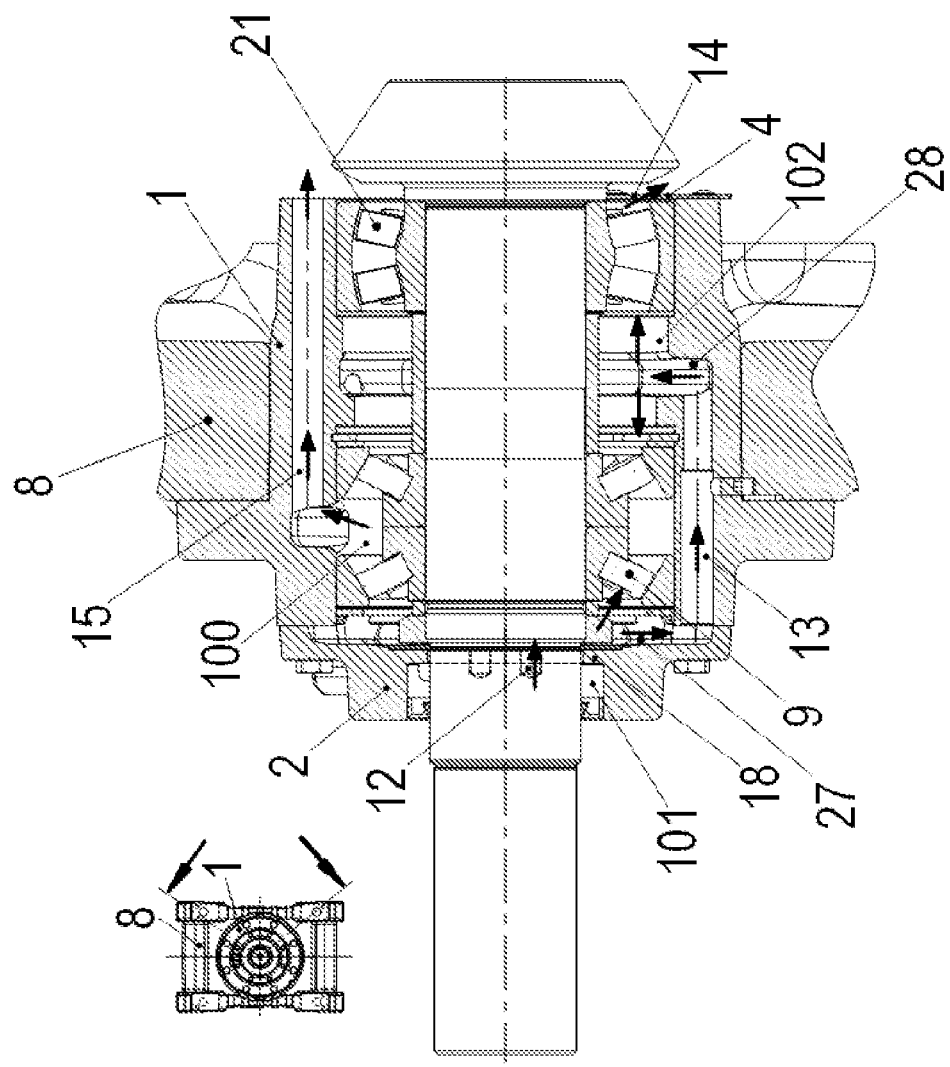
Fig. 1.2

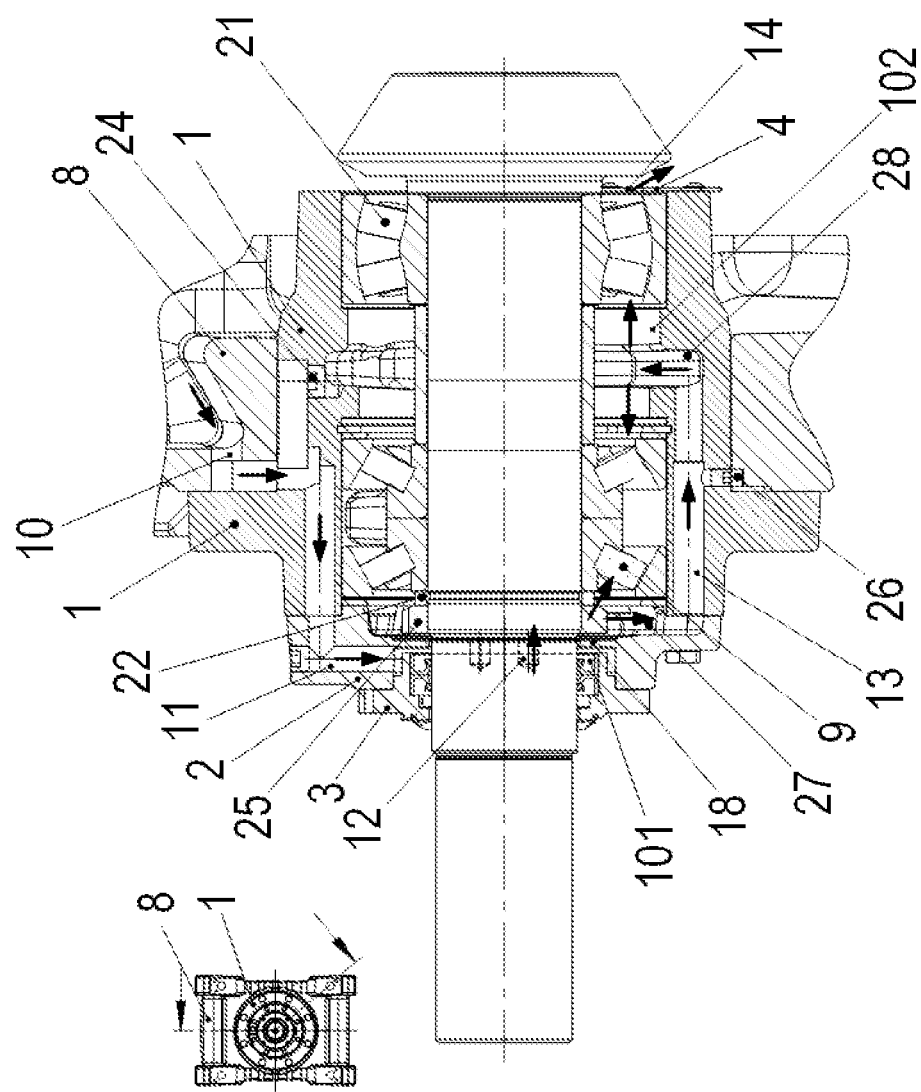
Fig. 2.1

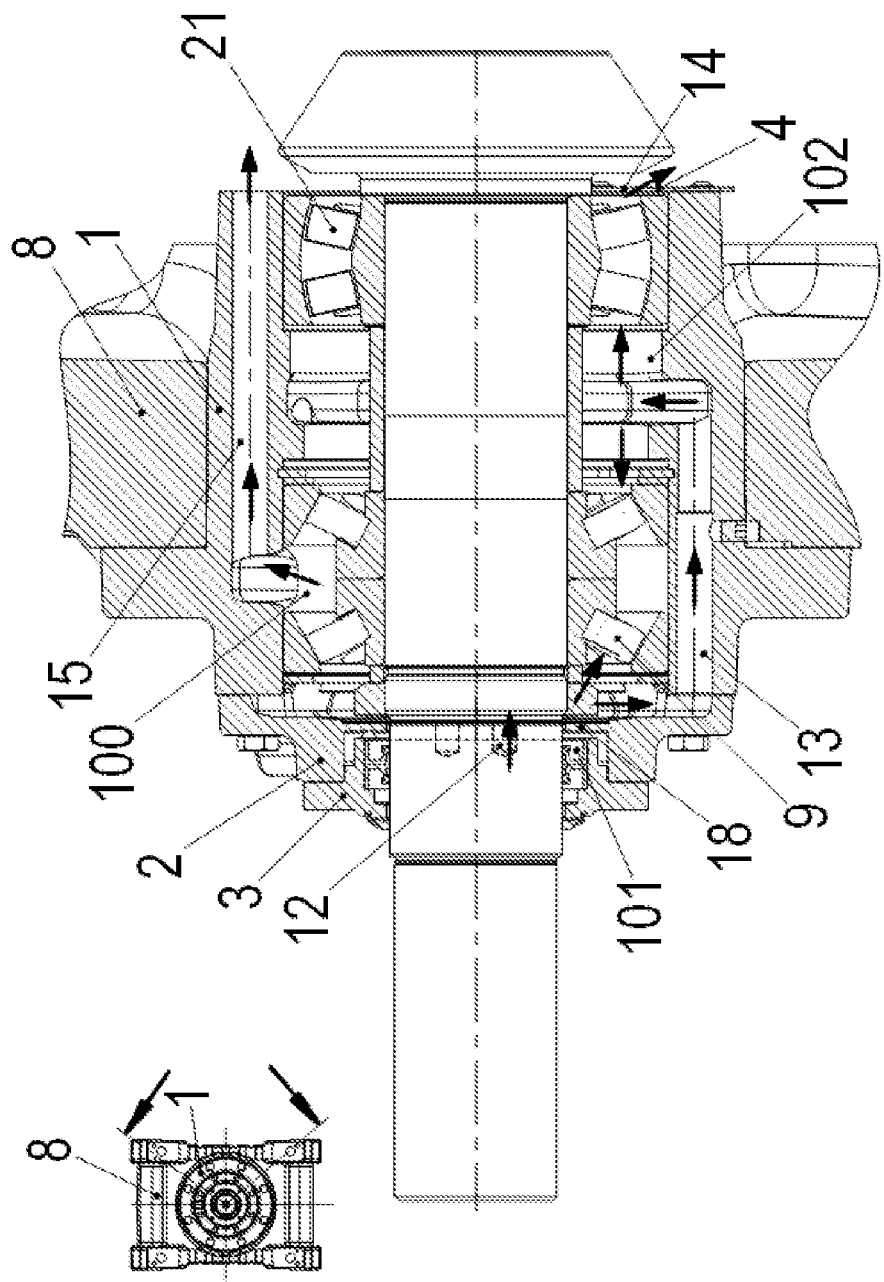
Fig. 2.2

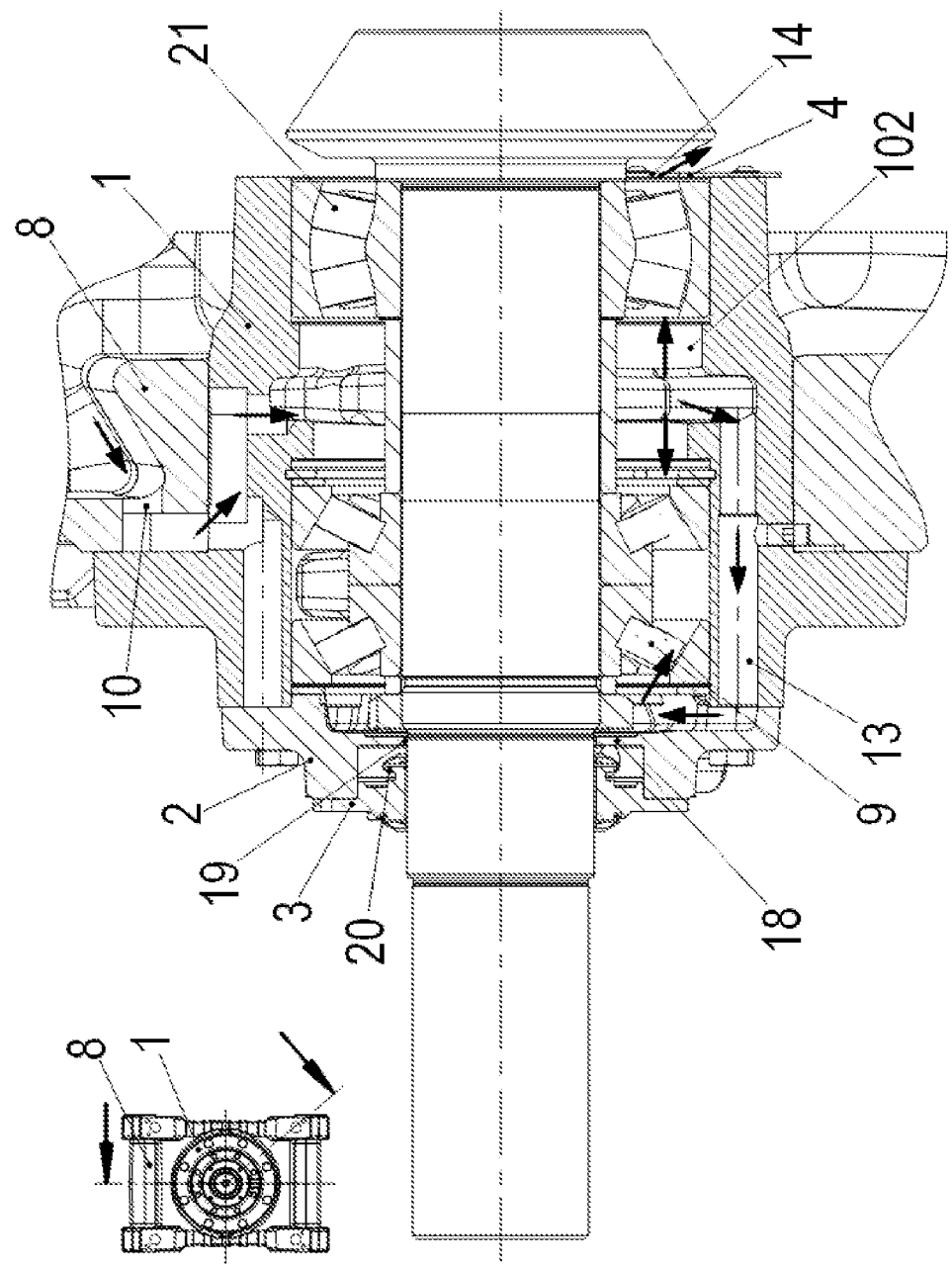
Fig. 3.1

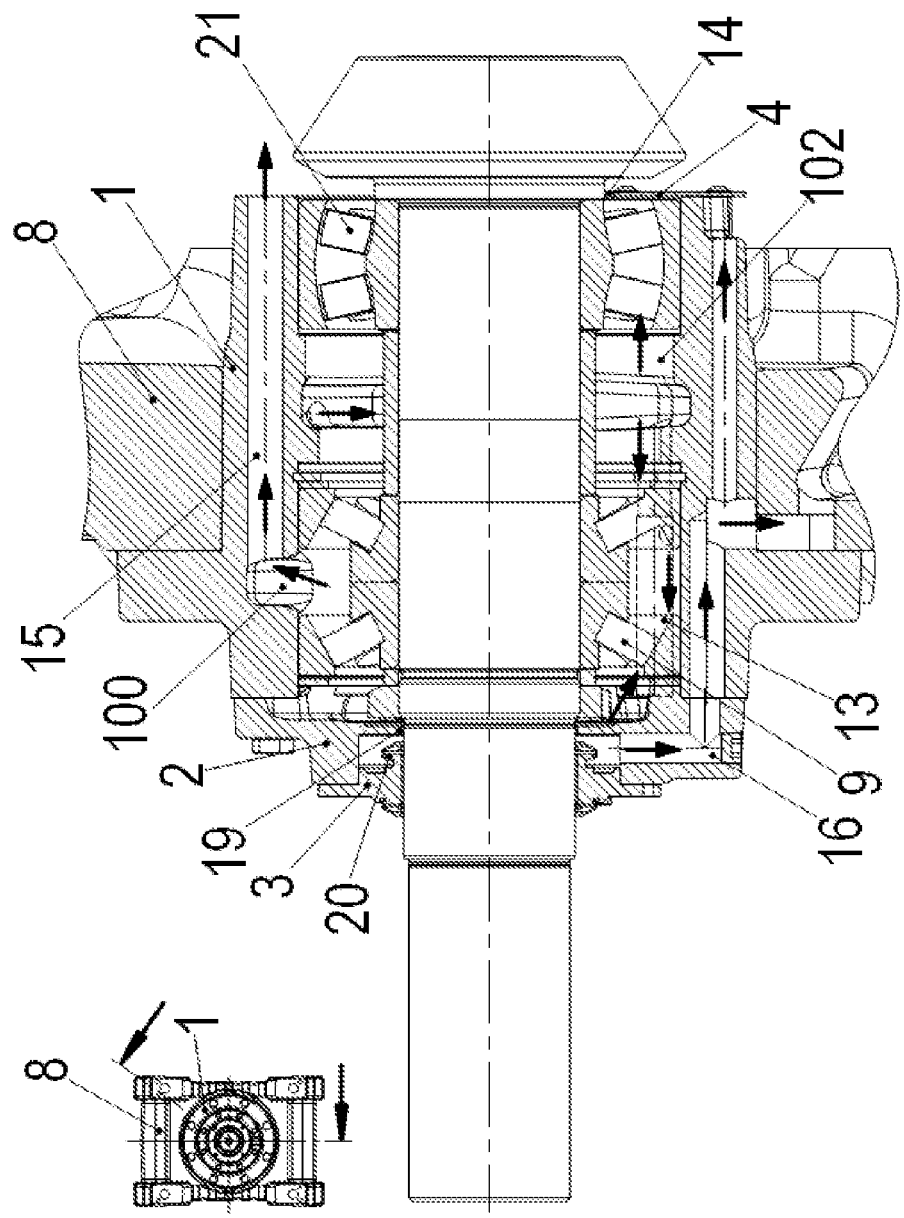
Fig. 3.2

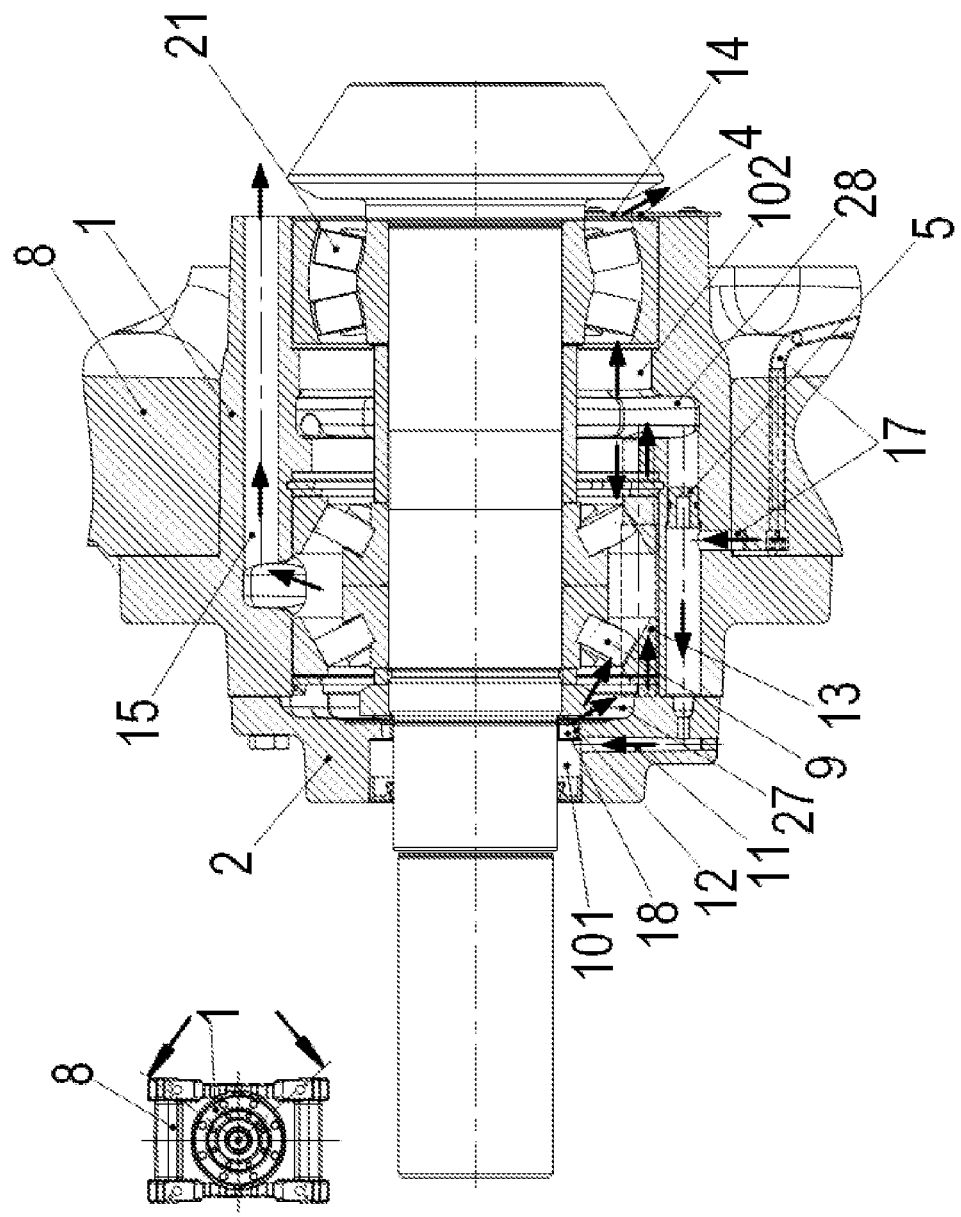
Fig. 4.1

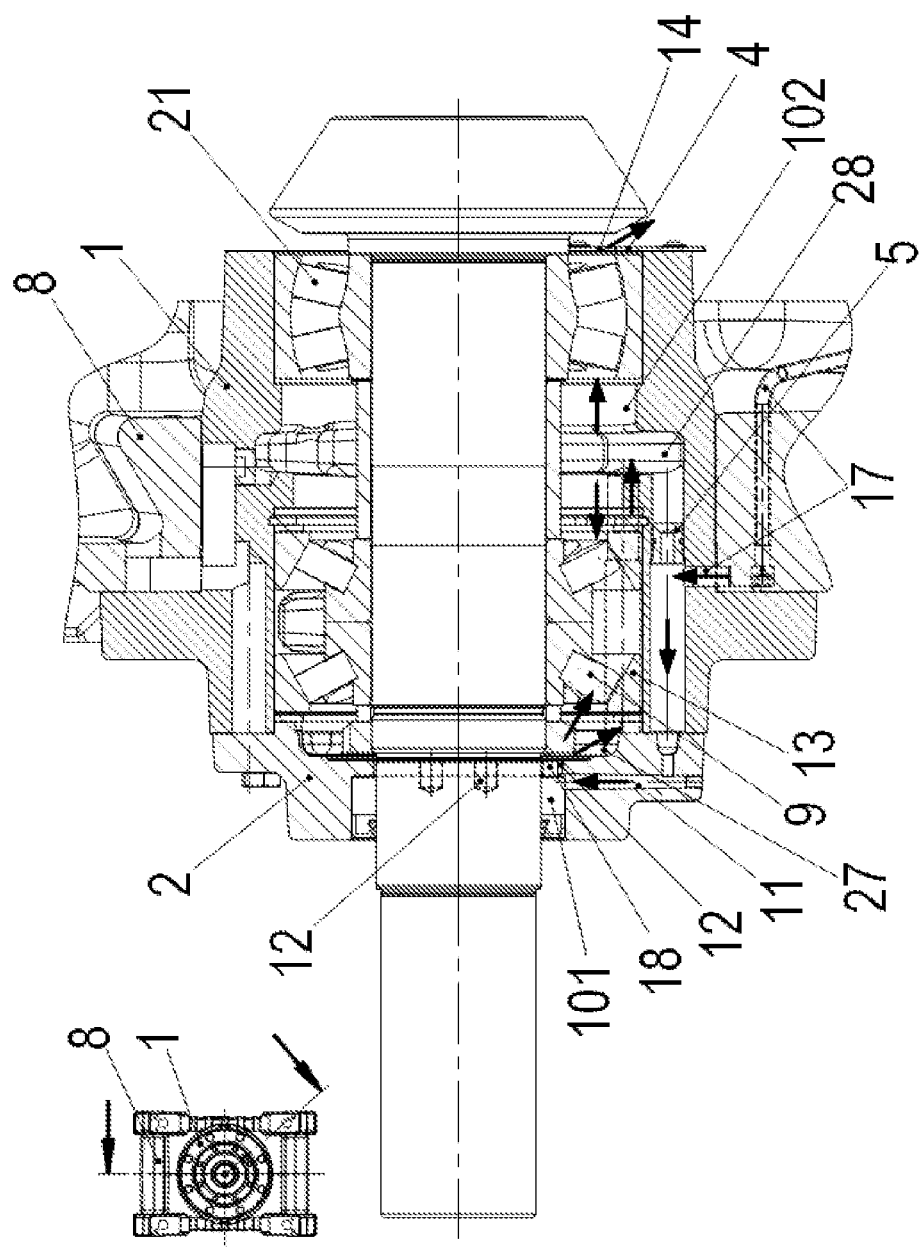
Fig. 4.2

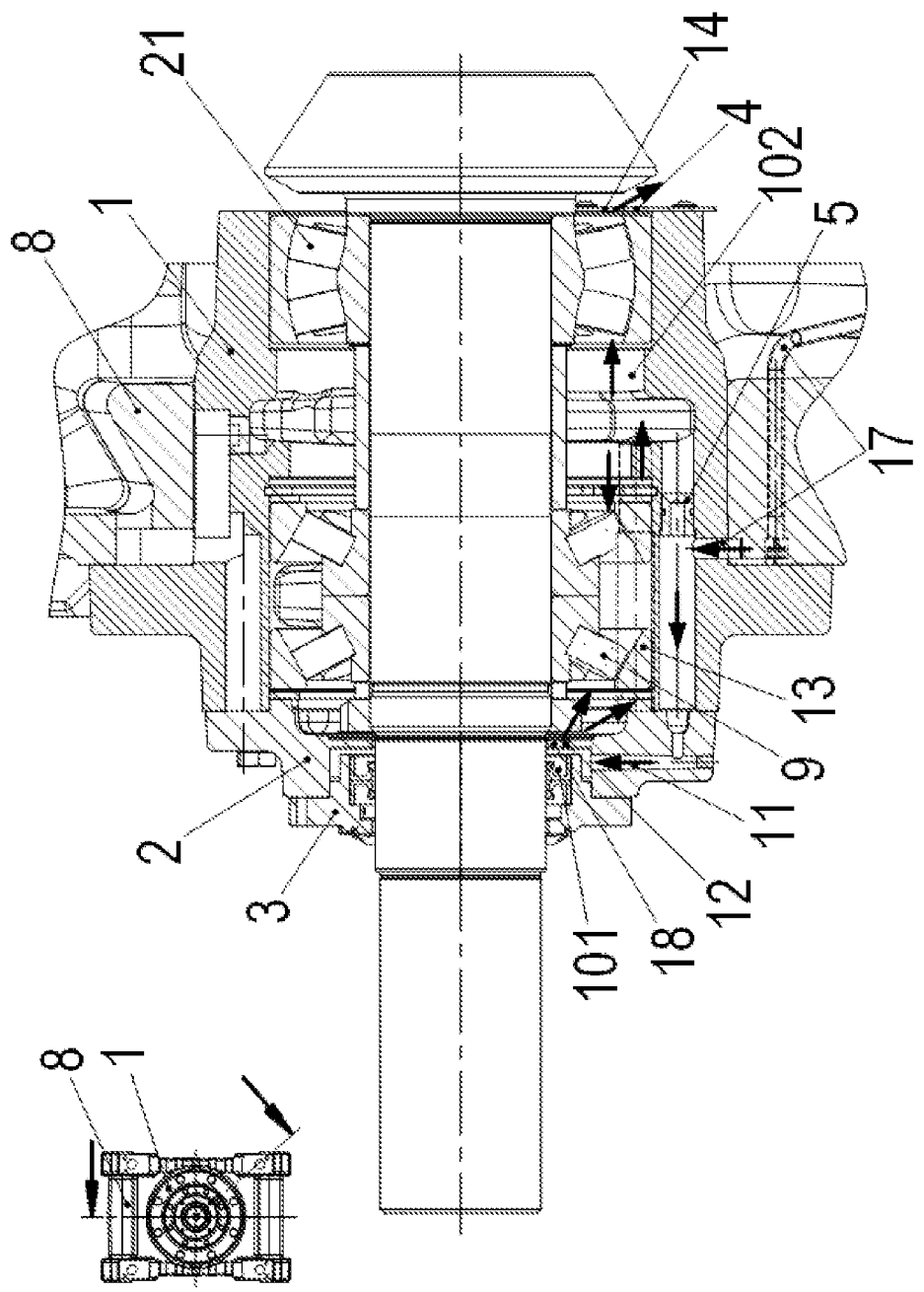
Fig. 5.1

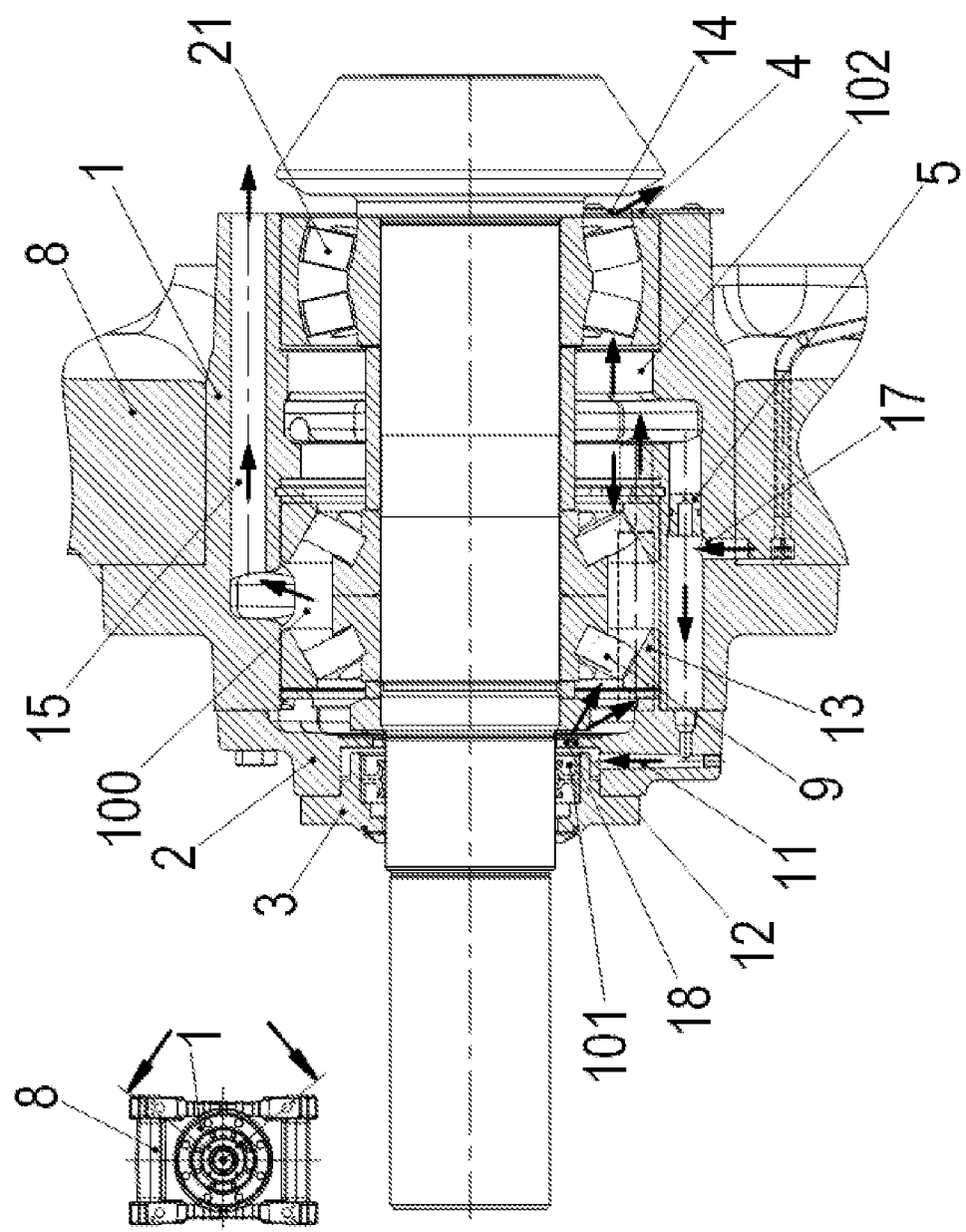
Fig. 5.2

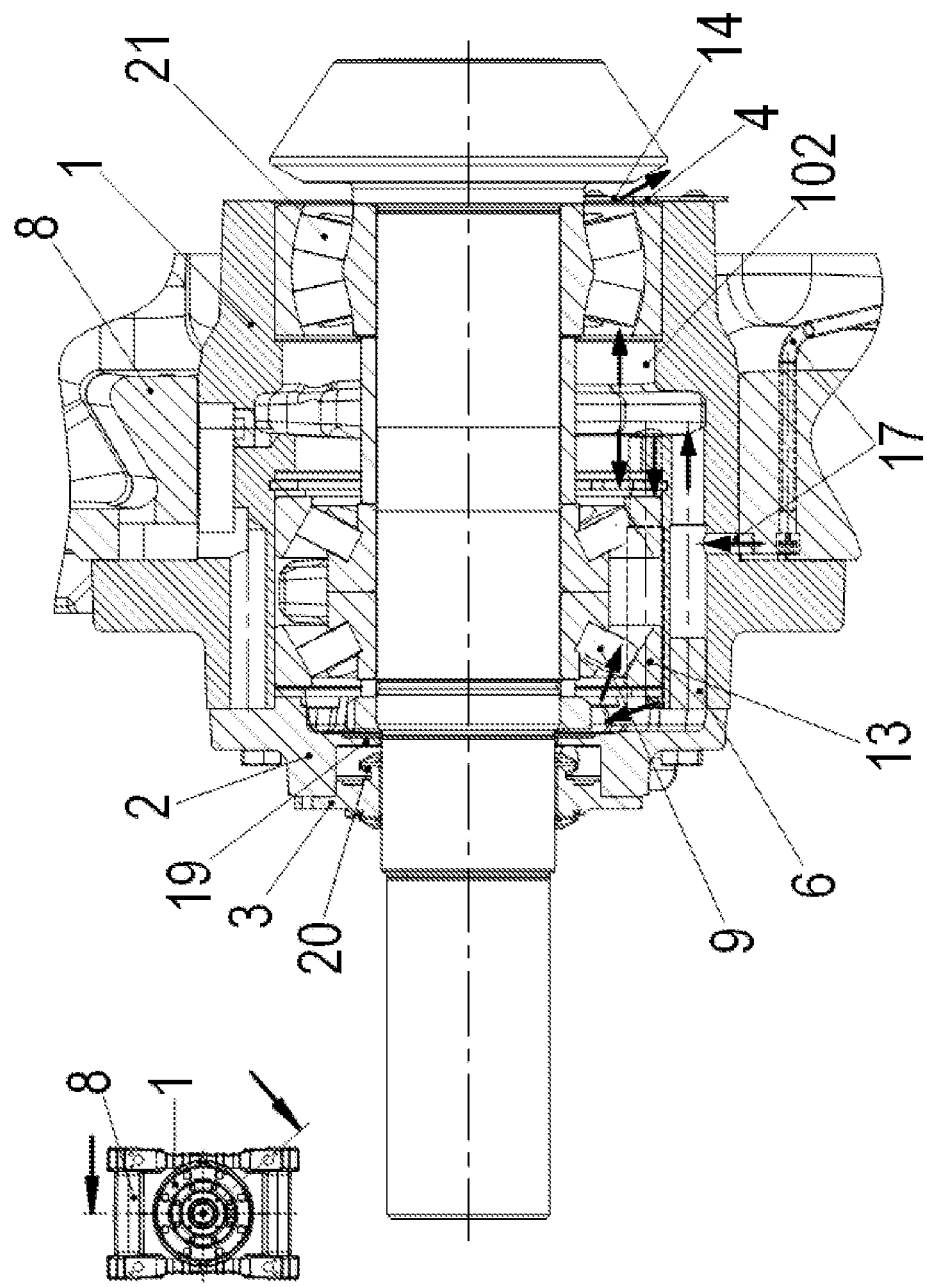
Fig. 6.1

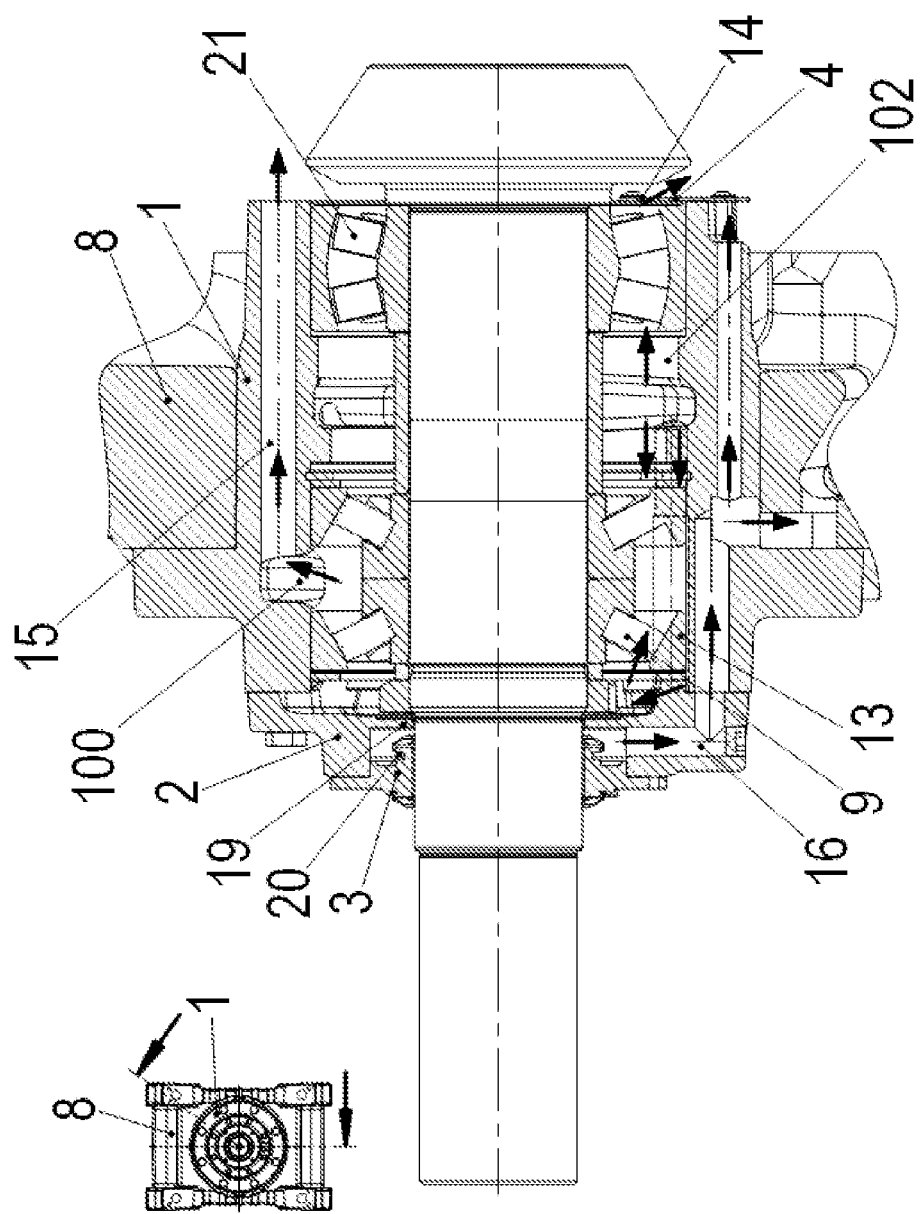
Fig. 6.2

TRANSMISSION AND METHOD FOR PRODUCING DIFFERENT TRANSMISSIONS, IN PARTICULAR A RANGE OF TRANSMISSIONS

CROSS-REFERENCE TO RELATED APPLICATIONS

The present application is a continuation of U.S. patent application Ser. No. 17/598,562, which is the national stage of PCT/EP2020/025098, having an international filing date of Feb. 27, 2020, and claims priority to Application No. 102019002191.6, filed in the Federal Republic of Germany on Mar. 26, 2019, each of which is expressly incorporated herein in its entirety by reference thereto.

FIELD OF THE INVENTION

The present invention relates to a transmission having a first housing part and to a method for producing different transmissions, e.g., a range of transmissions.

BACKGROUND INFORMATION

In certain conventional systems, a transmission has a housing part.

SUMMARY

Example embodiments of the present invention make the production of a transmission possible and cost-effective.

According to an example embodiment of the present invention, a transmission has a first housing part, a second housing part which is connected to the first housing part, and bearings, which are accommodated in the first housing part and support an input shaft in a rotatable manner, for example, a fixed bearing, which includes two the angular contact bearings, e.g., tapered roller bearings, and a floating bearing are provided as bearings. The input shaft projects through a recess that extends through the first housing part, e.g., the first housing part projects through a second recess that extends through the second housing part. A cover part is connected to the first housing part, the cover part, for example, being connected to the first housing part in an oil-tight manner with respect to the environment, and the cover part or a flange part inserted into the cover part accommodates a sealing system, which provides sealing with respect to the input shaft. The second housing part has an inlet for lubricating oil, which terminates in an axial bore that is introduced into the first housing part and has an open configuration with respect to a side of the first housing part facing the cover part, and in a second annular space. The opening of the axial bore facing the cover part is covered and/or sealed by the cover part, e.g., in order to form a blind hole, and rolling elements of two bearings, e.g., one of the two angular contact bearings of the fixed bearing and the floating bearing, at least also restrict and/or surround the second annular space together with the first housing part, for example, rolling elements of two bearings, e.g., of one of the angular contact bearings of the fixed bearing and the floating bearing, restricting and/or surrounding the first annular space together with the second housing part and together with a spacer bushing disposed on the input shaft.

This has the advantage that the axial bore makes it possible to exchange the cover part intended for a contactless seal for another cover part, which has a channel that terminates in the axial bore. From this channel, a sealing system, e.g., a shaft sealing ring, is able to be supplied with lubricating oil.

As a result, it is optionally possible to provide a seal in the cover part that requires or does not require lubrication.

In this manner, the second housing part may be used to produce different transmission variants.

The shaft is supported via a fixed bearing, which includes two tapered roller bearings situated axially next to each other, and a floating bearing. The spacing between the fixed bearing and the floating bearing is accomplished with the aid of a spacer bushing, and the distance region thereby created provides an interior space volume which may be used for an oil transport and in which oil conduction channels terminate from below and above, which are unsealed or sealed by a plug. Depending on the type of lubrication, e.g., immersion lubrication or pressure lubrication, and depending on the type of shaft seal, e.g., an oil-supplied shaft sealing ring or a contactless seal, and the associated cover part, an oil flow which provides efficient lubrication and cooling is able to be obtained. Compensation channels to the first annular space are provided to which oil can also be conveyed from above or below. In addition, the pumping action of the fixed bearing which is generated in the axial interspace between the tapered roller bearings of the fixed bearing during the operation, is utilized as well, the interspace terminating on its upper side in an oil channel that leads into the interior space of the transmission.

According to example embodiments, the second annular space has a stepped bore of the first housing part which features an axially aligned bore axis and includes an annular groove which encircles a step of the stepped bore. This offers the advantage that the second annular space is arranged as an oil distributor. Inflowing oil is distributed to the bearings axially on both sides.

According to example embodiments, lubricating oil is able to be conducted via a compensation bore from the second annular space into a first annular space, from where the rolling elements of a first one of the bearings, e.g., of a first angular contact bearing of the fixed bearing, are able to be supplied with lubricating oil. For example, the rolling elements of the first one of the bearings are situated in the oil sump formed in the first annular space, and the first annular space is arranged as a depression in the cover part, e.g., as a cup-shaped depression, and is restricted both by the cover part and the first housing part.

According to example embodiments, the oil passing through the second one of the two bearings, e.g., through the floating bearing, flows into the interior space of the transmission accommodating the gear stages of the transmission. For example, the oil passing through the second one of the two bearings, e.g., through the floating bearing, flows into the interior space of the transmission accommodating the gear stages of the transmission and into the oil sump located there. This offers the advantage that an oil flow for lubricating and heating the bearings is able to be built up.

According to example embodiments, a collection duct, which is located in the interior space of the transmission and, for example, is formed on the second housing part, terminates in the inlet, e.g., in order to catch oil that drips down and/or is splashed around, the collection duct, for example, catching lubricating oil that drips down the inner wall of the second housing part and conveys it to the inlet. This is considered advantageous insofar as an oil flow, and thus the lubrication and cooling, is able to be maintained during an operation.

According to example embodiments, the two bearings are set apart from each other with the aid of a spacer bushing situated on the input shaft. This has the advantage that the two bearings are able to be braced relative to each other using only a single shaft nut.

According to example embodiments, the sealing system has a first shaft sealing ring or a contactless seal, e.g., a labyrinth seal, and, for example, a grease-lubricated further shaft sealing ring is situated axially next to the first shaft sealing ring, the sealing system additionally, for example, having a dust-protected shaft sealing ring. This has the advantage that either a seal to be lubricated by oil can be used or a seal that does not require any oil lubrication.

According to example embodiments, the first bearing is arranged as a fixed bearing composed of two bearing parts, e.g., tapered roller bearings, for example, each one of the bearing parts being arranged as an angular contact bearing. The oil flowing in on both sides along the rolling elements of the first bearing that includes two parts, e.g., the fixed bearing, flows into an annular region axially between the rolling elements of the two bearing parts, e.g., angular contact bearings, and from there it is conveyed during the rotary motion of the bipartite bearing, e.g., fixed bearing, into an oil outlet, situated above the bearings, into the rest of the interior space of the transmission accommodating the gear stages, the entire interior space of the transmission encompassing the annular region, the first and second annular space as well as the rest of the interior space. This offers the advantage that an angular contact bearing that includes two parts can be used and the pumping effect induced axially between the two bearing parts, e.g., the angular contact bearings, can be utilized for transporting oil that is collecting there in an upward direction and for conveying it from there into the oil sump of the transmission. This makes it possible to maintain an oil flow and thereby induce not only the lubrication but also the cooling.

According to example embodiments, a retaining wall, which, for example, is arranged as a sheet metal part, is situated on the first housing part, and a gap is provided between the input shaft and the retaining wall. This is considered advantageous insofar as the retaining wall is able to bring about an oil level for the region of the sealing system.

According to example embodiments, the bearings are braced with respect to each other by a shaft nut screwed onto a threaded region of the input shaft. This offers the advantage that bracing of the bearings relative to each other can be readily brought about.

According to example embodiments, the region covered by the shaft nut in the axial direction overlaps with the region covered by the cover part in the axial direction. This has the advantage that the cover part forms a housing and protects the screw-fitting region from contamination or from an external force application.

According to an example embodiment of the present invention, in a method for producing different transmissions, a cover part is connected to the first housing part in order to produce a previously mentioned transmission, and a second cover part is optionally connected to the first housing part in order to produce a second transmission. The second cover part has a channel in which the axial bore terminates, e.g., the channel supplying oil to a sealing system accommodated in the cover part, e.g., the shaft sealing ring of the sealing system.

This offers the advantage that a great variety of transmissions in a transmission model series is able to be produced using only a small number of components.

According to example embodiments, in the second transmission, an overflow channel, e.g., an overflow channel situated in the cover part, on the one side terminates in the region of the cover part that accommodates the sealing system and in the first annular space on the other side. This offers the advantage that the oil level of the annular spaces is able to be compensated relative to one another.

According to example embodiments, a third cover part is connected to the first housing part for the optional production of a third transmission, and the third cover part has a channel, which terminates in a space region which accommodates the sealing system and in which an inflow channel for pressurized oil terminates, which is situated in the first housing part. This offers the advantage that a pressure lubrication is alternatively able to be carried out. The flow direction of the oil in the compensation channel is the reverse of the flow direction of the oil in the compensation channel that comes about in the immersion lubrication.

Further features and aspects of example embodiments of the present invention are described in greater detail below with reference to the appended schematic Figures.

BRIEF DESCRIPTION OF THE DRAWINGS

In FIGS. 1.1 to 6.2, the cutting direction through a transmission is shown in the upper left region. Also shown in the respective Figure is the associated sectional image.

FIG. 1.1 is a cross-sectional view of a transmission according to an example embodiment of the present invention featuring immersion lubrication and a shaft sealing ring.

FIG. 1.2 is another cross-sectional view of the transmission illustrated in FIG. 1.1.

FIG. 2.1 is a cross-sectional view of a transmission according to an example embodiment of the present invention featuring immersion lubrication and a dust-protected shaft seal.

FIG. 2.2 is another cross-sectional view of the transmission illustrated in FIG. 2.1.

FIG. 3.1 is a cross-sectional view of a transmission according to an example embodiment of the present invention featuring immersion lubrication and a contactless seal.

FIG. 3.2 is another cross-sectional view of the transmission illustrated in FIG. 3.1.

FIG. 4.1 is a cross-sectional view of a transmission according to an example embodiment of the present invention featuring pressure lubrication and a shaft sealing ring.

FIG. 4.2 is another cross-section view of the transmission illustrated in FIG. 4.1.

FIG. 5.1 is a cross-sectional view of a transmission according to an example embodiment of the present invention featuring pressure lubrication and a dust-protected shaft seal.

FIG. 5.2 is another cross-sectional view of the transmission illustrated in FIG. 5.1.

FIG. 6.1 is a cross-sectional view of a transmission according to an example embodiment of the present invention featuring pressure lubrication and a contactless seal.

FIG. 6.2 is another cross-sectional view of the transmission illustrated in FIG. 6.1.

DETAILED DESCRIPTION

Figure 7:
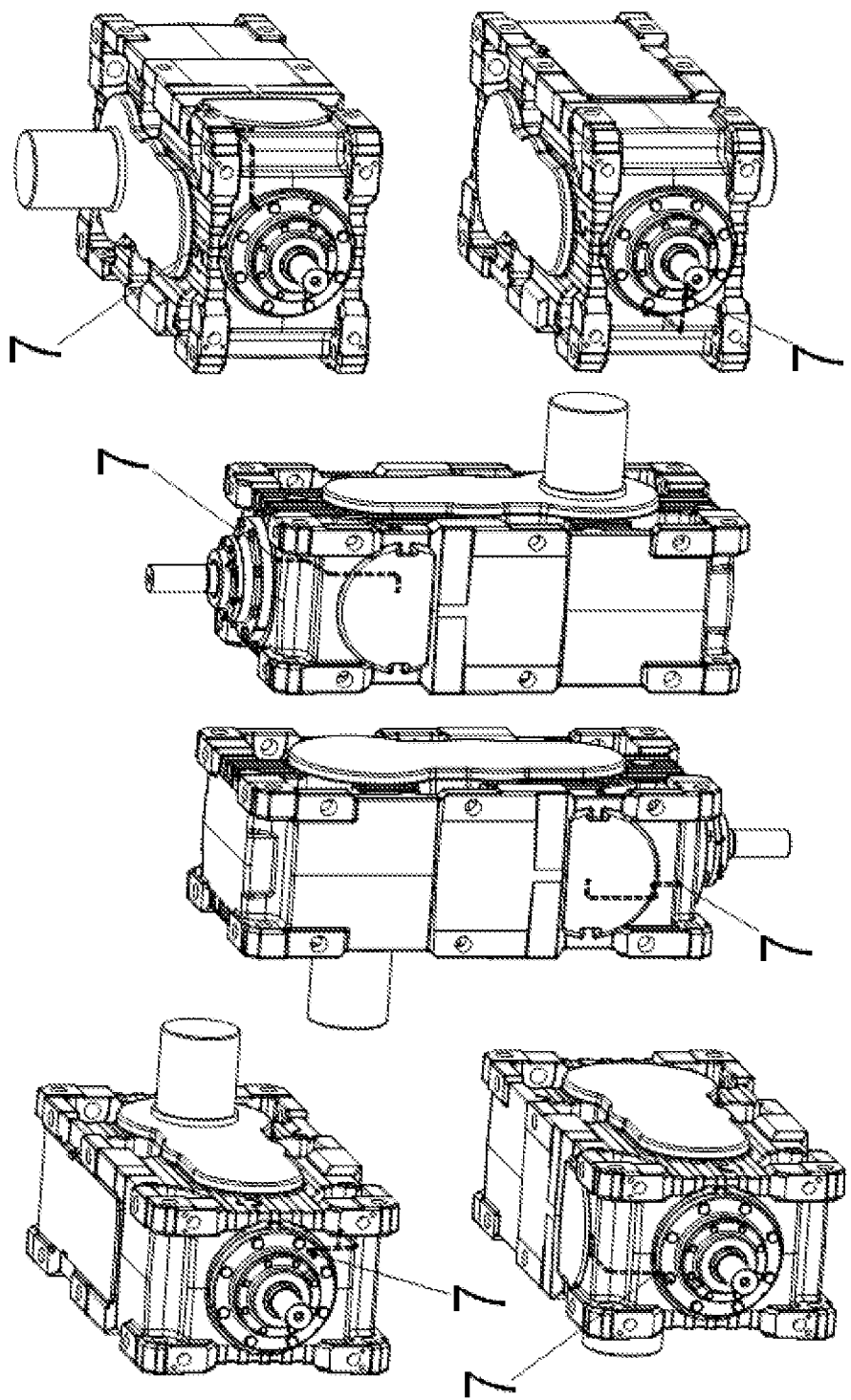
FIG. 7 illustrates shows different spatial positions of the transmission that are able to be covered by the previously mentioned example embodiments.

As schematically illustrated in FIGS. 1.1 and 1.2, the transmission has immersion lubrication. The rotating toothed parts dip into the oil sump of the transmission and fling oil into the interior space of the transmission up to its upper inner wall or ceiling, the interior space being arranged on a housing part 8 of the transmission. Oil dripping down from there is caught in a collection duct and conveyed into an oil inlet 10 that is introduced into a housing part 1.

This inlet 10 has a radial bore, which is introduced into housing part 1 and terminates in a recess of housing part 1 covered by housing part 8 of the transmission.

From this recess, an axial bore guides the oil along and terminates in an axial bore of a cover part 2 which is placed on top of housing part 1.

Housing part 1 accommodates a first angular contact bearing 9 of a fixed bearing, e.g., a tapered roller bearing, and a second angular contact bearing 21, e.g., a spherical roller bearing arranged as a floating bearing, for the support of the input shaft which is connected in a torsionally fixed manner to a bevel pinion meshing with a crown wheel, i.e., a counter wheel of the bevel pinion, which drives a second gear stage of the transmission.

The inner ring of the angular contact bearing 21 is placed against a step developed on the input shaft. A spacer sleeve is situated on the input shaft between the inner ring of the angular contact bearings (9, 21). Via a spacer ring 22, a shaft nut 25 which is screwed onto an external threaded region of the input shaft applies axial pressure on the inner ring of the first angular contact bearing 9, e.g., the bipartite fixed bearing, e.g., such that the bearings are adjusted.

The outer rings of the bearings on the one hand are placed against a step provided in respective housing part 1 and axially fixed in place with the aid of a circlip and/or spacer ring on the other hand.

Cover part 2 covers the fixed bearing and to this end is connected to housing part 1 by an interposed flat seal, e.g., in an oil-tight manner. However, instead of the flat seal, it is also possible to use a seal provided with a surface sealing compound, e.g., an adhesive being used as the surface sealing compound.

Cover part 2 accommodates a shaft sealing ring which extends on the input shaft.

The cover part has a retaining wall 18, which projects radially inward in the direction of the input shaft. A radial depression, in which an oil sump 101 accumulates, is arranged between retaining wall 18 and the shaft sealing ring. When the input shaft executes a rotary motion, this oil sump wets the shaft with oil and also supplies oil to the sealing lip of the shaft sealing ring.

A small gap exists between the input shaft and retaining wall 18 so that no oil tightness exists with respect to an annular space 27 which is arranged on housing part 1 and radially surrounds shaft nut 25. In addition, an overflow channel 12 is arranged on housing part 1, which is situated at a higher point than retaining wall 18, terminates in annular space 27 and is able to be filled from the radial depression arranged axially between the shaft sealing ring and retaining wall 18.

The oil conveyed through the axial bore in cover part 2 is routed via a radial bore to the particular region arranged axially between the shaft sealing ring and retaining wall 18 on cover part 2.

A first channel is therefore arranged in housing part 1, which supplies oil via the recess to channel 11 arranged in cover part 2.

Annular space 27 radially surrounding shaft nut 25 has an open configuration in the direction of the rolling element of bearing 9 so that oil from annular space 27 lubricates first angular contact bearing 9 of the fixed bearing.

In addition, a compensation channel 13 terminates in first annular space 27 and conveys the oil into a second annular space 28, which is arranged on housing part 1 axially between the bearings (9, 21), e.g., between the fixed bearing and the floating bearing.

This second annular space 28 has an open configuration axially on both sides in the direction of the rolling elements of the bearings (9, 21), e.g., the fixed bearing and the floating bearing, so that they are able to be supplied with oil.

Although a channel leads from the recess of housing part 1 into second annular space 28, this channel is sealed by a plug 24.

Excess oil therefore drains through floating bearing 21 by an overflow 14, which is arranged as a sheet metal part and fastened to housing part 1, into the interior space of the transmission accommodating the gear stages.

Second annular space 28 is formed by a stepped bore at whose step a circumferential annular groove is provided.

A plug 26 seals a radial bore which terminates in compensation channel 13 and is optionally provided for a pressure lubrication.

As illustrated in FIG. 1.2., the fixed bearing includes two parts, e.g., two angular contact bearings, e.g., tapered roller bearings. The oil flowing in on both sides along the rolling elements of the bipartite fixed bearing collects in an annular region axially between the rolling elements where it is subjected to the pumping action during the rotary motion of fixed bearing 9, so that the oil flows into an oil outlet 15 axially extending above the bearings (9, 21) to the rest of the interior space of the transmission accommodating the gear stages.

The oil lubrication flow brings about a lubrication of the bearings (9, 21) and the shaft sealing ring on the one hand and cooling of cover part 2 and housing part 1 together with the components surrounded by these two parts on the other hand.

As illustrated in FIG. 2.1 in conjunction with 2.2, the transmission there—in contrast to the example embodiment illustrated in FIGS. 1.1 and 1.2—has a different cover part 2 into which a flange part 3 is inserted.

Situated axially next to the shaft sealing ring is a further shaft sealing ring whose sealing lip also extends on the input shaft. This further shaft sealing ring is greased and the grease is stored in a grease chamber, which is situated axially between a dust-protected shaft sealing ring.

This dust-protected shaft sealing ring has a gap between the input shaft and flange part 3 and a sheet metal part that projects into a recess of flange part 3. In addition, a dust lip produced from plastic is situated on the sheet metal part, the dust lip sitting on flange part 3 so as to be substantially in contact, the sheet metal part being situated at a slight distance from flange part 3.

As illustrated in FIG. 3.1 in conjunction with 3.2, the transmission there—in contrast to the example embodiment illustrated in FIGS. 1.1 and 1.2—has a different cover part 2 which seals the axial bore disposed in housing part 1 and leads to cover part 2.

A flange part 3, which accommodates a contactless seal provided with respect to the input shaft, is inserted into a centered, axially continuous recess of this cover part 2. This seal requires no lubricating oil and must be kept away from lubricating oil. To this end, retaining wall 18 arranged on cover part 2 has only a gap in the direction of the input shaft, and the contactless seal inserted on flange part 3 provides sealing from the input shaft in the event that oil appears at the axial inner side of the contactless seal nevertheless.

Thus, a first seal 19 is arranged as a gap seal, and a second seal 20 is arranged as a contactless seal, e.g., a labyrinth seal.

The contactless seal is, for example, arranged as a labyrinth seal.

The oil flow is changed by a removed plug 24, which allows oil to pass from the recess of housing part 1 through a radial bore into second annular space 28. This is because no flow of oil takes place through the axial bore of housing part 1 supplied via the recess on account of the seal provided by cover part 2.

The rolling elements of bearings 9 and 21 are in turn supplied from second annular space 28.

In addition, however, the oil also flows from second annular space 28 through compensation channel 13 to first annular space 27 and from there, axially from the front, to the rolling elements of the first angular contact bearing 9, e.g., to the rolling elements of the first part of first angular contact bearing 9 of the fixed bearing.

The oil arriving in the center in bearing 9 is in turn conveyed into outlet 15 during the movement of the fixed bearing.

However, if oil still reaches the annular space between cover part 2 and flange part 3, situated axially between the dust-protected shaft seal and cover part 2, then this oil is drained through a downward-directed radial bore of cover part 2, which terminates in an axial bore of cover part 2 which in turn terminates either by itself or in the oil sump of the transmission via a radial bore that is directed further downward.

As illustrated in FIG. 4.1 in conjunction with 4.2, the transmission there—in contrast to the example embodiment illustrated in FIGS. 1.1 and 1.2—the transmission there has a different cover part 2, which once again seals the axial bore that is situated in housing part 1 and leads to cover part 2.

For the pressure lubrication configuration, plug 26 is removed and an oil line is connected to the radial bore implemented in housing part 1, from where oil is pressed into an axial bore which is sealed by a plug 5 from second annular space 28. The axial bore terminates in a channel, which, for example, includes an axial bore and a radial bore, the channel in cover part 2 terminating in the annular space situated axially between the shaft sealing ring accommodated in cover part 2 and retaining wall 18.

From this annular space, oil flows toward first annular space 27 and from there to the rolling elements of bearing 9 on the one hand and through an axial bore, which is set apart from the compensation bore in the circumferential direction, into second annular space 28, from where the rolling elements of bearings 9 and 21 are once again supplied with oil. The oil then emerges from bearing 21 on the side axially facing away from second annular space 28 to the interior space of the transmission accommodating the gear stages.

As illustrated in FIG. 5.1 in conjunction with 5.2, the transmission there—in contrast to the example embodiment illustrated in FIGS. 4.1 and 4.2—has a different cover part 2 in which a flange part is inserted once again, which has a further shaft sealing ring which is supplied with lubricating grease from the grease chamber again and includes the dust-protected shaft seal.

The lubrication of the shaft sealing ring directly facing the shaft nut, i.e. the first sealing ring, once again is carried out as in the example embodiment illustrated in FIGS. 4.1 and 4.2.

The oil conveyed under pressure is pressed through the channel situated in cover part 2 into the interspace between flange part 3 and cover part 2, the interspace being restricted not only by flange part 3 and cover part 2 but also by the first shaft sealing ring, which is thereby supplied with oil.

As illustrated in FIG. 6.1 in conjunction with 6.2, the transmission there—in contrast to the example embodiment illustrated in FIGS. 4.1 and 4.2—has a different cover part 2 into which a flange part having a contactless seal is inserted. The contactless seal is once again arranged according to the example embodiment illustrated in FIGS. 3.1 and 3.2.

In contrast, the oil conveyed under pressure is pressed out of the axial bore of housing part 1 into second annular space 28 because first annular space 27 is blocked by a plug 6 in the axial bore.

Via compensation channel 13, first annular space 27 is supplied with oil from second annular space 28.

From second annular space 28 filled with pressurized oil via the axial bore, the rolling elements of bearings 9 and 21 are in turn axially supplied on both sides. The fixed bearing includes two angular contact bearings, e.g., tapered roller bearings. The pumping action of the fixed bearing that includes the first angular contact bearing 9 and the further angular contact bearing conveys the oil collecting in the axial interspace between the two angular contact bearings in the upward direction into outlet 15 from where the oil flows into the rest of the interior space of the transmission.

The oil draining from bearing 21 on its side facing away from bearing 9 is directly introduced into the interior space of the transmission accommodating the gear stages.

FIG. 7 illustrates different spatial positions of the transmission that are able to be covered by the previously mentioned example embodiments. A single one of the illustrated example embodiments is not able to cover all illustrated spatial positions on its own. However, when using all of the example embodiments illustrated in FIGS. 1.1 to 6.2, the multitude of spatial positions illustrated in FIG. 7 is obtainable. Other spatial positions that result by pivoting the transmission about random spatial axes are possible in addition.

In further example embodiments, the transmission has a multi-stage configuration in which the input gear stage furthermore is a bevel gear stage and the downstream ones are spur gear stages.

LIST OF REFERENCE NUMERALS 1 housing part
2 cover part
3 flange part
4 sheet metal part, e.g., retaining plate
5 first plug
6 first plug
7 pressurized oil line
8 housing part
9 bearing
10 inlet for oil
11 channel
12 overflow channel
13 compensation channel
14 overflow
15 oil outlet
16 oil return channel
17 inlet for pressurized oil
18 retaining wall
19 first seal
20 second seal
21 bearing
22 spacer ring 23 plug
24 plug
25 shaft nut
26 plug
27 first annular space
28 second annular space
100 oil flow required by bearing
101 oil sump for shaft sealing ring
102 oil sump for start-up lubrication

What is claimed is:

1. A transmission, comprising:
a first housing part, a first recess extending through the first housing part;
a cover part connected to the first housing part;
a second housing part connected to the first housing part;
an input shaft extending through the first recess of the first housing part; and
bearings accommodated in the first housing part and rotatably supporting the input shaft;
wherein the second housing part includes a lubricating oil channel in fluid communication with an axial bore provided the first housing part, the axial bore being open with respect to a side of the first housing part facing the cover part and being in fluid communication with a first annular space arranged in the first recess of the first housing part, an opening of the axial bore facing the cover part being covered and/or sealed by the cover part; and
wherein a first one of the bearings is arranged on a first axial side of the first annular space, a second one of the bearings is arranged on a second axial side of the first annular space axially opposite the first axial side.

2. The transmission according to claim 1, wherein the bearings include (a) a fixed bearing that includes two angular contact bearings and/or tapered roller bearings and (b) a floating bearing.

3. The transmission according to claim 1, wherein the first housing part projects through a second recess that extends through the second housing part.

4. The transmission according to claim 1, wherein the cover part and the first housing part are connected to each other in an oil-tight manner with respect to the environment.

5. The transmission according to claim 1, wherein the first housing part includes a second annular space arranged in the first recess, at least one of the bearings being arranged on a first axial side of the second annular space, a spacer bushing arranged on the input shaft being arranged on a second axial side of the second annular space axially opposite the first axial side of the second annular space.

6. The transmission according to claim 1, wherein the first annular space includes a stepped bore of the first housing part having an axially aligned bore axis and an annular groove that encircles a step of the stepped bore.

7. The transmission according to claim 1, wherein a compensation bore is adapted to conduct lubricating oil from the first annular space into a second annular space of the first housing part.

8. The transmission according to claim 7, wherein rolling elements of at least one of the bearings and/or a first angular contact bearing of a fixed bearing are adapted to be supplied with the lubricating oil from the second annular space.

9. The transmission according to claim 8, wherein the rolling elements of the at least one of the bearings are arranged in an oil sump formed in the second annular space.

10. The transmission according to claim 7, wherein the second annular space is arranged as a depression in the cover part and is delimited both by the cover part and the first housing part.

11. The transmission according to claim 1, wherein the transmission is configured so that lubricating oil passing through at least one of the bearings flows into an interior space of the transmission that accommodates at least one gear stage of the transmission.

12. The transmission according to claim 11, wherein the transmission is configured so that the lubricating oil passing through at least one of the bearings flows into the interior space of the transmission that accommodates the gear stage of the transmission and into an oil sump located in the interior space.

13. The transmission according to claim 1, wherein a collection duct is arranged in an interior space of the transmission and terminates in an inlet, the collection duct adapted to catch lubricating oil that drips down and/or splashes around and/or that drips down an inner wall of the second housing part and to conveys the lubricating oil to the inlet.

14. The transmission according to claim 1, wherein two of the bearings are set apart from each other by a spacer bushing arranged on the input shaft.

15. The transmission according to claim 1, wherein the bearings include a fixed bearing and a floating bearing that are set apart from each other by a spacer bushing arranged on the input shaft.

16. The transmission according to claim 1, further comprising a sealing system accommodated by the cover part and/or a flange part arranged in the cover part, the sealing system sealing the input shaft, the sealing system including a first shaft sealing ring, a contactless seal, or a labyrinth seal.

17. The transmission according to claim 16, wherein a grease-lubricated further shaft sealing ring is arranged axially next to the first shaft sealing ring and/or the sealing system includes a dust-protected shaft seal.

18. The transmission according to claim 1, wherein at least one of the bearings includes a fixed bipartite bearing including two bearing parts and/or tapered roller bearings.

19. The transmission according to claim 18, wherein each bearing part is arranged as an angular contact bearing.

20. The transmission according to claim 1, wherein the bearings are braced with respect to one another by a shaft nut screwed onto a threaded region of the input shaft.

21. The transmission according to claim 20, wherein a region covered by the shaft nut in an axial direction overlaps with a region covered by the cover part in the axial direction.

* * * * *